W. HESTON.
Packings for Piston-Rods and Valve-Stems.

No. 141,052. Patented July 22, 1873.

Attest:
J. Mason Wozler
A. P. Lacey

Inventor.
William Heston
By N. Crawford, atty.

UNITED STATES PATENT OFFICE.

WILLIAM HESTON, OF AKRON, OHIO.

IMPROVEMENT IN PACKINGS FOR PISTON-RODS AND VALVE-STEMS.

Specification forming part of Letters Patent No. 141,052, dated July 22, 1873; application filed April 11, 1873.

*To all whom it may concern:*

Be it known that I, WILLIAM HESTON, of Akron, in the county of Summit, in the State of Ohio, have made certain Improvements in Packing for Piston-Rods or Valve-Stems, of which the following is a specification:

The object of this invention is to introduce into general use a packing ready constructed of the right dimensions and shape to fit into the stuffing-box and onto the rod or stem without further preparation after it comes from the manufacturer; and it consists of the article so manufactured.

Figure 1:
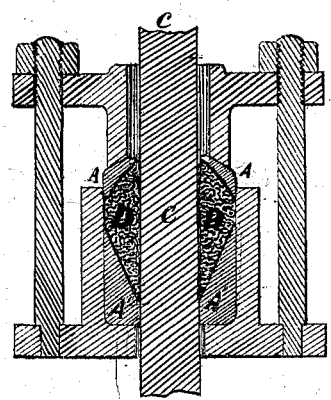
Figure 2:
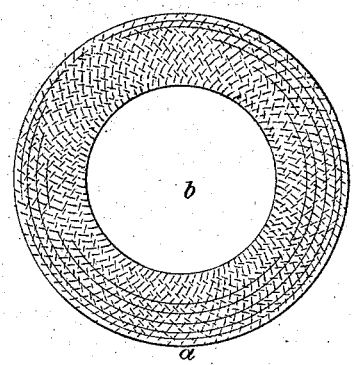
Figure 3:
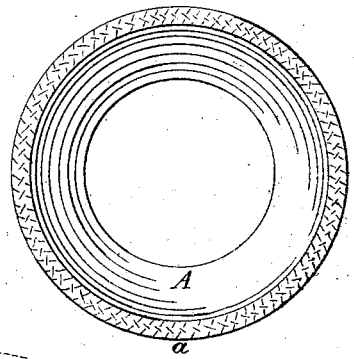
Figure 4:
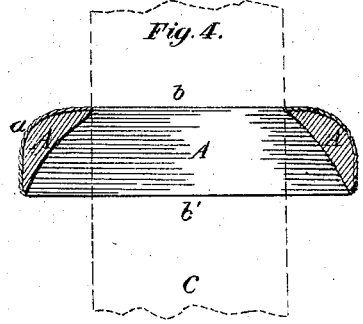

In the drawings, Figure 1 represents an upright section of a stuffing-box with the packing and rod or stem therein; Fig. 2, the outer side of the packing; Fig. 3, the inner side; and Fig. 4, a section of the same.

A represents the packing in the form seen, made of rubber and covered with strong canvas $a$, and having the bore $b$ to fit on and embrace the rod or stem, while the larger bore $b'$ and the inner conical form of the rubber will fit upon and can be compressed around the conical fibrous packing D that is around the piston-rod or valve-stem C, as seen in Fig. 1.

This packing is made by first having the canvas of the right size and shape to fit into the bore of the stuffing-box in which it is to be used, and to turn over to form a kind of hem at its edges; then placed in a proper mold with the proper quantity of plastic or sheet rubber within it, when a conical plunger is forced into it and forms the conical shape of the inner part of the packing, when it can be vulcanized and intimately connect the rubber with the canvas covering, so that they will be inseparable.

A packing thus constructed is very durable and cheap, needs no fitting, as the diameter of the piston-rod or valve-stem is always in proportion to the inner diameter of the stuffing-box, and the bore at each side of the packing can be known; hence, when the diameter of the rod or stem is known, the size of the packing is then easily determined, and when determined will fit into the box and onto the rod or stem.

The packing can be made to have different forms and embrace the conical fibrous packing on the piston-rod, as seen in Fig. 1, without departing from the spirit of the invention, for both forms are produced by the same mode of construction, and are alike in everthing, except form, and will be known by purchasers by such construction.

A packing, such as above described, has long been wanted, but has never been produced as an article on sale to be selected as to size, and to fit the place in which it is to be used.

Having thus described my invention, what I claim, and desire to secure by Letters Patent, is—

The packing above described, as a new article of manufacture, constructed substantially as described.

WILLIAM HESTON.

Witnesses:
  J. A. MEANS,
  W. W. WARNER.